US005724344A

United States Patent [19]

Beck

[11] Patent Number: 5,724,344

[45] Date of Patent: Mar. 3, 1998

[54] AMPLIFIER USING A SINGLE FORWARD PILOT SIGNAL TO CONTROL FORWARD AND RETURN AUTOMATIC SLOPE CIRCUITS THEREIN

[76] Inventor: William Federick Beck, 2735 Pioneer Rd., Hatboro, Pa. 19040

[21] Appl. No.: 626,352

[22] Filed: Apr. 2, 1996

[51] Int. Cl.$^{6}$ .................. H03F 3/62

[52] U.S. Cl. .................. 370/295; 370/491; 330/52

[58] Field of Search .................. 370/295, 491, 370/496, 497; 330/52; 333/18, 17.1, 16, 15

[56] References Cited

U.S. PATENT DOCUMENTS

| | | | |
|---|---|---|---|
| 1,438,219 | 12/1922 | Clark . | |
| 1,507,160 | 9/1924 | Crisson . | |
| 1,615,911 | 2/1927 | Nyquist . | |
| 3,483,334 | 12/1969 | Hermes | 370/491 |
| 3,548,120 | 12/1970 | Tarassoff | 370/491 |
| 4,208,640 | 6/1980 | van der Meijis | 333/18 |
| 4,535,443 | 8/1985 | Korevaar | 370/24 |
| 4,580,260 | 4/1986 | Blackburn | 370/295 |
| 4,583,220 | 4/1986 | Blackburn | 370/295 |
| 4,835,494 | 5/1989 | Preschutti | 333/16 |
| 4,947,386 | 8/1990 | Preschutti | 370/26 |
| 4,969,162 | 11/1990 | Karr | 375/12 |

FOREIGN PATENT DOCUMENTS 52-6011 1/1977 Japan .

OTHER PUBLICATIONS

S. Seiya & T. Tanaka, abstract of Japanese patent application JP 63016743, filed Jan. 27, 1988, Aug. 2, 1989.

*Primary Examiner*—Douglas W. Olms
*Assistant Examiner*—Matthew C. Phillips
*Attorney, Agent, or Firm*—Irwin Ostroff; Erwin Pfeifle

[57] ABSTRACT

A bidirectional amplifier that compensates for signal attenuation in a transmission medium uses a first diplex filter for directing a first signal including a pilot signal and propagating in a first direction along a first section of the transmission medium onto a first path of the amplifier. A second diplex filter directs a second signal in a different frequency band than the first signal that is propagating in a second direction opposite to the first signal along a second section of the transmission medium onto a second path of the amplifier. The first and second paths interconnect separate sections of the first and second diplex filters. A compensating device is disposed in the first and second paths wherein a pilot detection circuit detects the pilot signal in the first signal and generates therefrom separate control signals to first and second Bode Slope Equalizers in the first and second paths, respectively. The first and second Bode Slope equalizers separately change the equalization of each of the first and second signals across the first and second frequency bands, respectively, propagating in the respective first and second paths to separately change the amplification of the first and second signals, respectively, in order to compensate for signal attenuation changes occurring in the first section of the transmission medium.

11 Claims, 2 Drawing Sheets

AMPLIFIER USING A SINGLE FORWARD PILOT SIGNAL TO CONTROL FORWARD AND RETURN AUTOMATIC SLOPE CIRCUITS THEREIN

FIELD OF THE INVENTION

The present invention relates to bidirectional amplifiers which use a pilot signal for controlling compensating circuits in downstream and upstream paths of the amplifier so as to compensate for changes in signal attenuation in a section of a transmission medium.

BACKGROUND OF THE INVENTION

Future services for, for example, Hybrid Fiber Coaxial (HFC) networks require more stable upstream communications than presently provided. In a broadband coaxial cable network, the coaxial cable employed therein changes its insertion loss with changes in ambient temperature. The approximate change in insertion loss is, for example, one percent (1%) for every ten degrees Fahrenheit (10° F.) shift in temperature. As a result, increases in temperature cause increases in cable attenuation, and decreases in temperature cause decreases in cable attenuation. Still further, cable attenuation varies with frequency in accordance with the formula $\alpha=(F1/F2)^{1/2}$, where F1 is a first frequency and F2 is a second frequency. These changes in slope $[(F1/F2)^{1/2}]$ and in attenuation are known to be compensated for with a variable equalizer and a closed loop, pilot-guided, control circuit in the forward (downstream) path of a CATV amplifier. Various conventional arrangements have been disclosed for correcting for losses incurred in upstream and downstream transmissions over a single cable section that interconnect two nodes of a communication system.

Referring now to FIG. 1, there is shown a block diagram of a bidirectional amplifier 10 (shown within a dashed line rectangle) disclosed as a prior art bidirectional amplifier in U.S. Pat. No. 4,835,494 (Preschutti), issued on May 30, 1989. The bidirectional amplifier 10 comprises a first temperature correcting circuit 12 (shown within a dashed line rectangle), a second temperature correcting circuit 50 (shown within a dashed line rectangle), first and second diplex filters (DPX FLT) 14 and 16, first and second fixed equalizers (EQ.) 18 and 20, and first and second amplifiers (AMP.) 22 and 24. The bidirectional amplifier 10 uses a first forward pilot signal propagating in a downstream signal on a first coaxial cable section 11 for controlling the forward-only first temperature correcting circuit 12 to compensate for signal attenuation in the first coaxial cable section 11. In the downstream direction, the first diplex filter 14 receives a high (HI) frequency signal including a first pilot signal propagating on the first coaxial cable section 11, and couples the high frequency signal to a first directional path 15 within the bidirectional amplifier 10. The high frequency signal on the first directional path 15 is serially coupled through the first Equalizer 18, the first amplifier 22, and the first temperature correcting circuit 12. The first temperature correcting circuit 12 comprises an attenuator (ATTN) 30, an amplifier (AMP.) 32, and a directional coupler (DIR. CPLR.) 34, and a pilot detection circuit 36. An output of the first amplifier 22 is serially coupled through the attenuator 30, the amplifier 32, and the directional coupler 34. A first output of the directional coupler 34 is coupled to the input of the second diplex filter 16 for directing the high frequency signal onto a second coaxial cable section 19 for further propagation in the downstream direction. A second output of the directional coupler 34 is coupled to an input of the pilot detection circuit 36 which detects an instantaneous level of the first pilot signal in the high frequency signal and provides a representative control signal at an output thereof. The output of the pilot detection circuit 36 is coupled to a second input of the attenuator 30 for controlling the amount of attenuation introduced into the high frequency signal on propagating on the first directional path 15.

In an upstream direction, a low (LO) frequency signal including a second pilot signal that is propagating on the second coaxial cable section 19 is received by the second diplex filter 16. The second diplex filter 16 couples the received low frequency signal onto a second directional path 17 of the bidirectional amplifier 10. The low frequency signal on second directional path 17 is serially coupled through the second amplifier 24, the second temperature correcting circuit 50, and the second equalizer 20 to a low (LO) frequency input of the first diplex filter 14. The first diplex filter 14 couples the low frequency signal onto the first coaxial cable section 11 for further propagation in the upstream direction. The second temperature correcting circuit 50 comprises an attenuator (ATTN) 40, an amplifier (AMP.) 42, a directional coupler (DIR. CPLR.) 44, and a pilot detection circuit 46. An output of the second amplifier 24 is serially coupled through the attenuator 40, the amplifier 42, and the directional coupler 44. A first output of the directional coupler 44 is coupled through the equalizer 20 to the input of the first diplex filter 14 for directing the high frequency signal onto the first coaxial cable section 11 for further propagation in the upstream direction. A second output of the directional coupler 44 is coupled to an input of the pilot detection circuit 46 which detects an instantaneous level of the second pilot signal in the low frequency signal and provides a representative control signal at an output thereof. The output of the pilot detection circuit 46 is coupled to a second input of the attenuator 40 which for controlling the amount of attenuation introduced into the low frequency signal on propagating on second directional path 17.

In operation, the high frequency signal on the first coaxial cable section 11 is directed by the first diplex filter 14 onto the first directional path 15 and serially through the first equalizer 18, the first amplifier 22, and the first temperature correcting circuit 12 to the high frequency signal input of the second diplex filter 16. In passing through the first temperature correcting circuit 12, the first signal is attenuated in attenuator 30, amplified by a predetermined amount in amplifier 32, and passed through the directional coupler 34. The first pilot signal in the first signal is diverted to the pilot detection circuit 36 by the directional coupler 34 and is detected in the pilot detection circuit 36. The pilot detection circuit 36 generates a control signal in response to a detected level of the pilot signal. The control signal generated by the pilot detection circuit 36 is transmitted to the second input of the attenuator 30. The attenuator 30 responds to the control signal from the pilot detection circuit 36 to appropriately adjust the level of the received high frequency signal to a predetermined signal level.

In the upstream direction, the low frequency signal including the second pilot signal is received by the second diplex filter 16 from the second coaxial cable section 19 and is coupled onto second directional path 17. On path 17, the low frequency signal is serially transmitted through the second amplifier 24, the second temperature correcting circuit 50, and the second equalizer 20 to a low frequency input of the first directional coupler 21 for further upstream transmission on the first coaxial cable section 11. In passing through the second temperature correcting circuit 50, the second signal is attenuated in attenuator 40, amplified by a predetermined amount in amplifier 42, and passed through the directional coupler 44. The second pilot signal in the second signal is diverted to the pilot detection circuit 46 by the directional coupler 44 and is detected in the pilot detection circuit 46. The pilot detection circuit 46 generates a control signal in response to a detected level of the second pilot signal. The control signal generated by the pilot detection circuit 46 is directed to the second input of the attenuator 40. The attenuator 40 responds to the control signal from the pilot detection circuit 46 to appropriately adjust the level of the received low frequency signal on second directional path 17 to a predetermined signal level.

In a return path (upstream direction) of other prior art amplifiers, often cable slope/attenuation changes are compensated for with an open-loop, thermistor-controlled, slope control (not shown in FIG. 1), or with a separate pilot-controlled Automatic Gain Control similar to that shown in FIG. 1. The pilot controlled return systems in the prior art amplifiers are dependent upon end-of-line pilot signal generators that add cost and complexity, and are largely unstable for generating reference carriers. More particularly, open-loop, thermistor-controlled, return paths are subject to inaccuracies from local system topology. In other words, the coaxial cable is not in the same environment as the amplifier which causes the amplifier to over-or under-compensate for signal attenuation on a cable. In systems where a thermal compensation factor is preselected in an amplifier by a technician, the thermal compensation that is provided by an amplifier can be too much or too little for a given length of cable.

Referring now to FIG. 2, there is shown a block diagram of a a node 55 (shown within a dashed line rectangle) disclosed in the Preschutti patent (U.S. Pat. No. 4,835,494), mentioned hereinbefore. The node 50 comprises a bidirectional amplifier 60 (shown within a dashed line rectangle), a pilot detection circuit 80, and a line balancer device 90 (shown within a dashed line rectangle), for providing automatic gain control for balancing losses in a first coaxial cable section **61*a*. The line balancer device 90 comprises a fixed equalizer (EQ) 92 and a variable cable simulator (SIM) 94. The bidirectional amplifier 60 comprises a first bandsplitting filter 62 on a downstream side, a second bandsplitting filter 64 on an upstream side, a first directional path 65 for downstream signals between the first and second bandsplitting filters 62 and 64 comprising a first radio frequency (rf) amplifier (AMP.) 68 and a directional coupler (DIR. CPLR.) 70 in series, and a second path 67 for upstream signals between the first and second bandsplitting filters 62 and 64 comprising a second rf amplifier (AMP.) 66. The pilot detection circuit 80 comprises a Radio Frequency (RF) receiver (not shown) and a simulator drive circuit (not shown) coupled in series between an output of the directional coupler 70 of the bidirectional amplifier 60 and an input to the variable cable simulator 94 of the line balancer device 90 to form a feedback circuit. In operation, a first signal in a first frequency band comprising a pilot signal that is propagating in a downstream direction on cable section 61*a* is received by the line balancer device 90. In the line balancer device 90, the first signal, and any second signal in an opposite direction to the first signal passing therethrough, is equalized in the equalizer 92 to provide a first fixed amount of flat attenuation across the entire frequency band of the signals passing therethrough. The variable cable simulator 94 then provides a variable amount of loss for simulating a variable amount of coaxial cable, where the length of the first cable 61*a* simulated may vary based on the length and temperature of the cable section 61*a* to provide a second fixed amount of attenuation across the entire frequency band of the signals passing therethrough. The first signal is transmitted via an intermediate cable section 61 to the bidirectional amplifier 60. In the bidirectional amplifier 60, the first signal is coupled to the first directional path 65 where the first signal is amplified in the first amplifier 68, and transmitted to an input of the directional coupler 70. The directional coupler 70 directs a portion of the first signal to the pilot detection circuit 80. The remaining portion of the downstream signal is directed via the first path to the second bandsplitting filter 64 for further downstream propagation on a second cable section 69**.

A second signal in a second frequency band that is propagating in an upstream direction on the second cable section 69 is received by the bidirectional amplifier 60. In the bidirectional amplifier 60 the second signal is coupled via the second bandsplitting filter 64 onto second path 67 where the second signal is serially passed through the second amplifier 66, the first bandsplitting filter 62, the intermediate cable section 61, and the line balancer 90 for further upstream propagation on the first cable section **61*a***.

In the pilot detection circuit 80, the RF receiver (not shown) generates an output DC signal that is proportional to the energy of the pilot signal in the downstream signal for transmission to the simulator drive circuit. The simulator drive circuit (not shown) compares the DC output signal from the RF receiver with a preset reference DC signal and generates a control signal therefrom to the variable cable simulator 94 in the line balancer device 90. The variable cable simulator 94 uses this control signal adjust its simulation of the appropriate amount of cable. The line balancer device 90 allows simultaneous adjustment of downstream and upstream signal path losses in the first cable section **61*a* by monitoring a pilot signal propagating in only the downstream signal path on first cable section 61*a* and adjusting the variable cable simulator 94 to provide a proper path loss for the downstream cable section 61*a*. The problem with this arrangement is that by using a single driver in the pilot detection circuit 80 and a single active device (simulator 94) to affect both the forward and return paths, it places an enormous amount of loss in the return (upstream) path so that the return path gain has to be significantly higher than the actual cable loss of the return (upstream) signal. The additional gain matches the gain of the forward (downstream) path gain. This additional return gain forces added circuit complexity of the diplex filters 62 and 64 and raises the cost of the amplifier 60 since amplifier 60 requires higher path isolation to prevent loop oscillation within the bidirectional amplifier 60. The node 55 uses a line balancer circuit 90 external to the bidirectional amplifier 60** that uses a single driver signal and a single active device to compensate for signal attenuation changes in signals propagating in both the forward and return directions of a first cable section.

Japanese Patent No. 52-6011 (Yamaguchi), issued on Jan. 18, 1977, discloses data transmission equipment comprising first and second communication devices that are interconnected by a channel. In operation, signal transmissions that are sent downstream from second communication device to the first communication device are received in the first communication device. A receiving automatic equalizer circuit in the first communication device detects the received signal and corrects for any waveform distortion that occurred in the downstream direction on the channel. A control circuit obtains the control signal used by the receiving equalizer and sends this control signal to a similar sending automatic equalizer circuit in order to precompensate for the waveform distortion that is expected to be found in the upstream signal being sent to the second communication device on the channel.

It is desirable to provide a bidirectional amplifier that receives a single pilot signal propagating in a first direction (e.g., a downstream direction) along a section of a transmission medium and compensates for changes in the section of the transmission medium by independently equalizing and changing the amplification of first and second signals in different frequency bands propagating in downstream and upstream paths, respectively, within the bidirectional amplifier.

SUMMARY OF THE INVENTION

The present invention is directed to a bidirectional amplifier that uses a single pilot signal received from a section of a transmission medium as, for example, a Hybrid Fiber Coaxial network to compensate for changes occurring in the section of the transmission medium by independently equalizing and changing the amplification of first and second signals in different frequency bands propagating in downstream and upstream paths, respectively, within the bidirectional amplifier.

Viewed from one aspect, the present invention is directed to a bidirectional amplifier comprising first and second paths therein, coupling means, and compensating means. The first and second paths propagate a first signal including a pilot signal and a second signal, respectively, having respective first and second different frequency bands in first and second opposite directions, respectively, within the bidirectional amplifier. The coupling means couples the first and second signals received from first and second cable sections, respectively, of a transmission medium onto the respective first and second paths. The compensating means, which is disposed in the first and second paths and is responsive to the pilot signal in the first signal, independently changes equalization and amplification of each of the first and second signals across the first and second frequency bands, respectively, propagating in the respective first and second paths of the bidirectional amplifier to compensate for signal attenuation changes occurring in the first section of the transmission medium.

Viewed from another aspect, the present invention is directed to a method of compensating for signal transmission changes on a transmission medium in a bidirectional amplifier. In a first step of the method, a first data signal and a pilot signal in a first frequency band that is propagating in a first direction along a first section of the transmission medium is coupled onto a first path of the bidirectional amplifier and then onto a second section of the transmission medium. In a second step of the method, a second signal in a second frequency band that is different than the first frequency band that is propagating in a second direction opposite to the first signal along the second section of the transmission medium is coupled onto a second path of the bidirectional amplifier and then onto the first section of the transmission medium. In a third step of the method, the pilot signal is detected while the first signal is propagating along the first path. In a fourth step of the method, at least one control signal representative of a level of the pilot signal is generated in response to the third step. In a fifth step of the method, each of the first and second signals propagating in the first and second paths, respectively, are separately equalized in response to the at least one control signal generated in the fourth step to independently change the amplification of the bidirectional amplifier in the first and second paths and independently compensate for signal attenuation changes occurring in the first section of the transmission medium.

The invention will be better understood from the following more detailed description taken with the accompanying drawings and claims.

DETAILED DESCRIPTION

The present invention is described hereinafter for use in a Hybrid Fiber Coaxial Cable network. It should be understood that the principles described hereinafter can be applied to other transmission media communication networks as, for example, wire cable or microwave networks.

Figure 3:
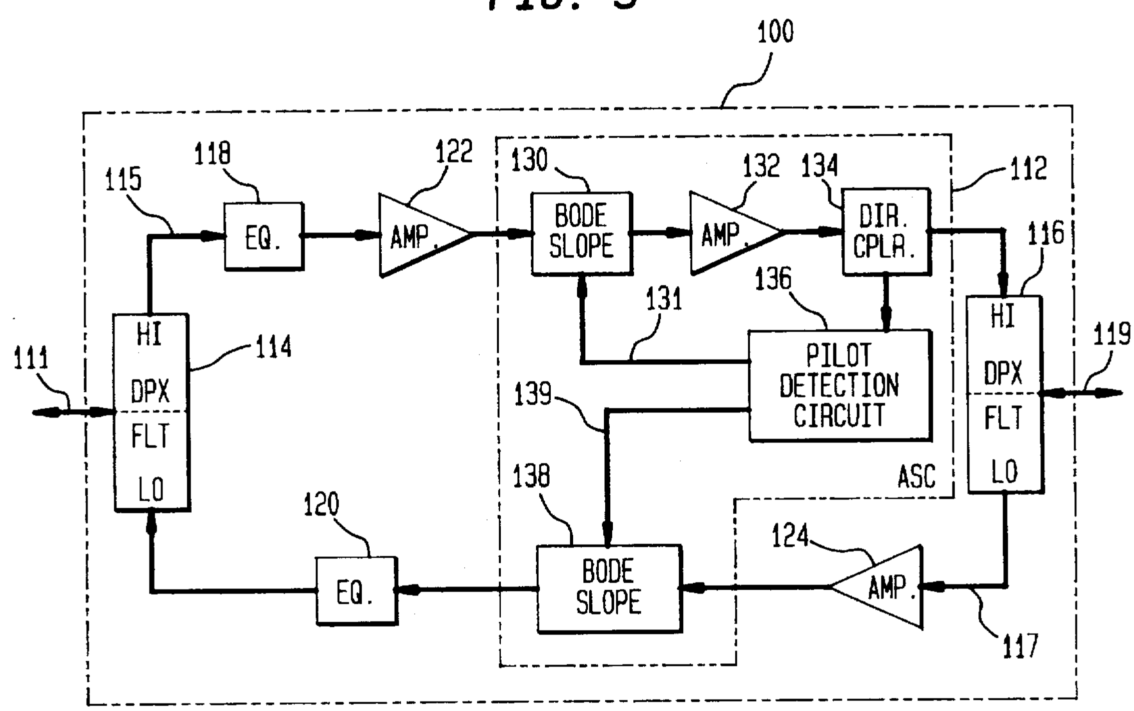
FIG. 3 is a block diagram of a bidirectional amplifier that uses a single pilot to control forward and return Automatic Slope Control circuits within the bidirectional amplifier in accordance with the present invention.

Referring now to FIG. 3, there is shown a block diagram of a bidirectional amplifier 100 (shown within a dashed line rectangle) for use in, for example, a Hybrid Fiber Coaxial (HFC) network to compensate for signal attenuation across first and second frequency bands in a network transmission medium in accordance with the present invention. The bidirectional amplifier 100 comprises a forward (downstream) and return (upstream) Automatic Slope Control circuit (ASC) 112 (shown within a dashed-line area) (compensating means), first and second diplex filters (DPX FLT) 114 and 116, first and second equalizers (EQ) 118 and 120, and first and second amplifiers (AMP.) 122 and 124. In a downstream (forward) direction, the first diplex filter 114 receives a high (HI) frequency band signal including a pilot signal from a first coaxial cable section 111 and couples it via a high frequency (HI) output to a first path 115 within the bidirectional amplifier 100. The high frequency band signal with the pilot signal on the first path 115 is serially coupled through the first Equalizer 118 and the first amplifier 122 to an input of the ASC circuit 112. An output of the ASC circuit 112 is coupled to a high frequency (HI) input of the second diplex filter 116. The second diplex filter 116 directs the high frequency band output signal from the ASC circuit 112 to a first output thereof for further downstream propagation via a second coaxial cable section 119.

The ASC circuit 112 comprises a first Bode Slope equalizer (BODE SLOPE) (equalizer compensating means) 130, an amplifier (AMP.) 132, a directional coupler (DIR. CPLR.) 134, a pilot detection circuit 136, and a second Bode Slope Equalizer (BODE SLOPE) 138. An output of the first amplifier 122 is coupled to a first input of the Bode Slope Equalizer 130 with an output thereof coupled to an input of the amplifier 132. An output of the amplifier 132 is coupled to an input of the directional coupler 134, and a first output of the directional coupler 134 is coupled to the first input (HI input) of the second diplex filter 116. Such interconnections permit the high frequency signal propagating along path 115 to further propagate in a downstream direction on the second coaxial cable section 119. A second output of the directional coupler 134 in the ASC circuit 112 is coupled to an input of the pilot detection circuit 136. A first output of the pilot detection circuit 136 is coupled to a second input of the first Bode Slope Equalizer 130 via a lead 131, and a second output of the pilot detection circuit 136 is coupled to a first input of the second Bode Slope Equalizer 138 via a lead 139.

In an upstream (return) direction, a low frequency band signal is received by the second diplex filter 116 from the second coaxial cable section 119. The second diplex filter 116 directs the received low frequency band signal via a low frequency band output (LO) to a second path 117 of the bidirectional amplifier 100. The low frequency signal on the second path 117 is coupled to an input of the second amplifier 124. An output of the second amplifier 124 is coupled to a second input of the second Bode Slope Equalizer 138 in the ASC circuit 112, and an output of the second Bode Slope equalizer 138 is coupled to an input of the second equalizer 120. The output of the second equalizer 120 is coupled to a low frequency band (LO) input of the first diplex filter 114 which directs the low frequency band signal onto the first coaxial cable section 111.

In operation, the high frequency band (HI) signal on the first coaxial cable section 111 comprises an information signal and a pilot signal. The high frequency band signal is directed by the first diplex filter 114 from its high frequency band (HI) output onto the first path 115 where the signal serially propagates through the first equalizer 118, the first amplifier 122, and the ASC circuit 112 to the high frequency signal band (HI) input of the second diplex filter 116. In passing through the ASC circuit 112, a portion of the high frequency signal including the pilot signal is directed to the pilot detection circuit 136. The pilot signal in the high frequency signal is detected by the pilot detection circuit 136. In response to the detected pilot signal, the pilot detection circuit 136 generates a first DC drive signal representative of the level of the detected pilot signal and transmits such drive signal to the first Bode Slope equalizer 130 via the lead 131. Concurrent therewith, the pilot detection circuit 136 generates a second DC drive signal representative of the level of the detected pilot signal and transmits such drive signal to the second Bode Slope equalizer 138 via the lead 139. The first and second Bode Slope equalizers 130 and 138 are radio frequency (rf) circuits that attenuate frequencies in an inverse proportion to the first coaxial cable section 111. Still further, the first and second Bode Slope equalizers 130 and 138 are variable circuits that are each driven with a separate DC drive voltage generated in the pilot detection circuit 136. Varying the amount of the DC drive voltage to a Bode slope equalizer (130 or 138) varies the amount of compensation that the Bode Slope equalizer 130 or 138 provides for a corresponding change in the first cable section 111. The first Bode Slope Equalizer 130 uses the first DC voltage drive signal representative of the level of the detected pilot signal to appropriately adjust the level of the received high frequency band signal to a predetermined signal level in the downstream direction.

In the upstream direction, the low frequency band signal is received on the second coaxial cable section 119 and is directed by the second diplex filter 116 via its low frequency band (LO) output onto the second path 117 of the bidirectional amplifier 100. The low frequency band signal is serially coupled through the second amplifier 124, the second Bode Slope Equalizer 138, and the second equalizer 120 to a low frequency band (LO) input of the first diplex coupler 114 for further transmission in an upstream direction via first coaxial cable section 111. The second Bode Slope Equalizer 130 uses the second DC voltage drive signal generated by the pilot detection circuit 136 in response to the detected upstream pilot signal to appropriately adjust the level of the received low frequency signal passing therethrough to a predetermined signal level in the upstream direction.

The pilot detection circuit 136 generates a first DC control signal to the first Bode Slope Equalizer 130 via lead 131, and a second DC control signal to the second Bode Slope Equalizer 138 via the lead 139. More particularly, the Pilot Detection circuit 136 generates a DC drive signal representative of the detected upstream pilot signal. The DC voltage drive signal needed for the first Bode Slope Equalizer 130 might, for example, be required to fall within a range of from 5–20 volts to exercise the first Bode Slope Equalizer 130 over its desired range. However, the DC voltage drive signal for the second Bode Slope Equalizer 138 might be scaled down from that required for the first Bode Slope Equalizer 130 by an amount of, for example, 1 to 10 because the desired operating range of the second Bode Slope Equalizer 138 is generally not as great. For example, the DC drive voltage provided by the pilot detection circuit 136 to the second Bode Slope Equalizer via lead 139 might be scaled down to a range of from 0.5–2 volts if that is all the second Bode Slope Equalizer 138 requires. It is to be understood that, in general, the DC drive voltage provided to the second Bode Slope Equalizer 138 might have a range that is the same or less than the range required for the first Bode Slope Equalizer 130. More particularly, the ranges of the DC drive voltages to the first and second Bode Slope Equalizers 130 and 138 depend on the radio frequency (rf) design provided in each of the first and second Bode Slope Equalizers 130 and 138. Depending on such rf designs, the DC drive voltages would be scaled into separate DC drive voltage ranges that match the required operating ranges of each of the first and second Bode Slope Equalizers 130 and 138. Such scaling down of the DC drive voltage to the second Bode Slope Equalizer 138 can be accomplished, for example, by placing a predetermined resistor (not shown) in the lead 139 to lower the range of the DC drive signal by a predetermined linear scale factor to the second Bode Slope Equalizer 138 from that provided to the first Bode Slope Equalizer 130. This permits the equalization and amplification to be independently controlled in each of the first and second paths 115 and 117 within the bidirectional amplifier 100.

Figure 1:
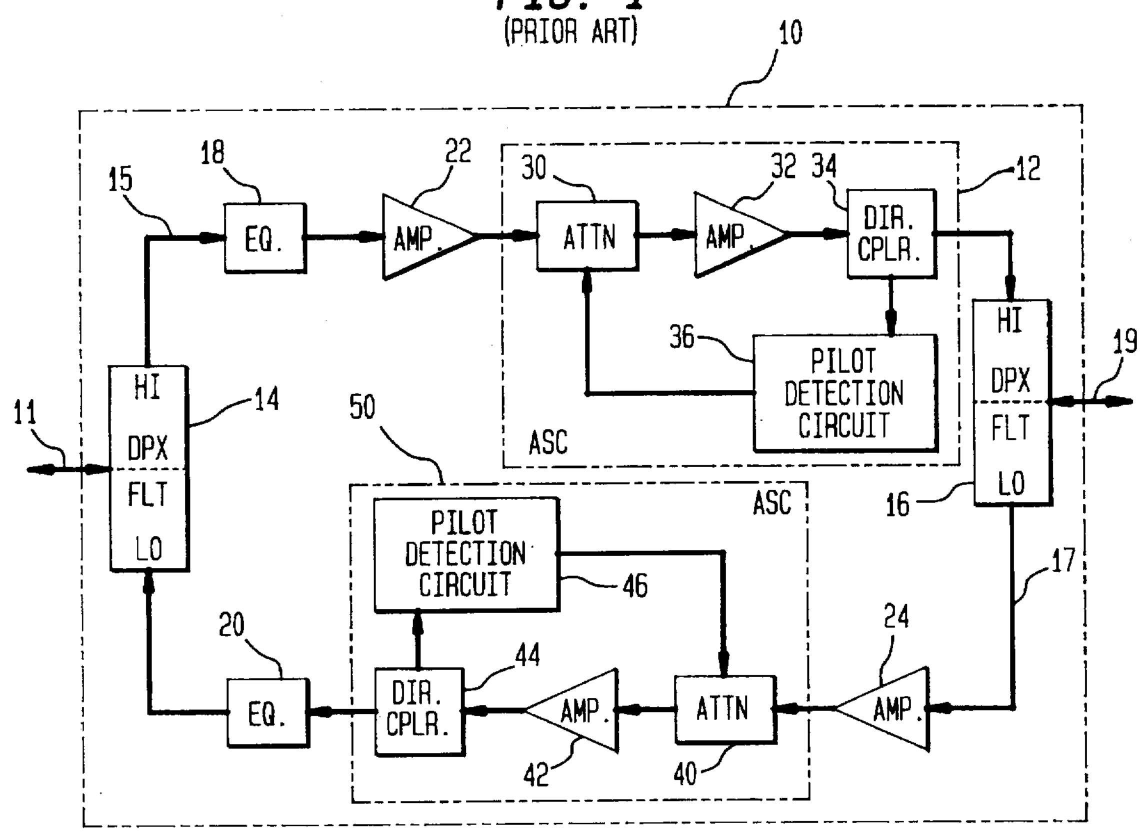
FIG. 1 is a block diagram of a prior art amplifier that uses a separate forward and return path pilot signal for controlling changes in forward and return signals due to changes occurring in first and second cable sections coupled to the amplifier.
Figure 2:
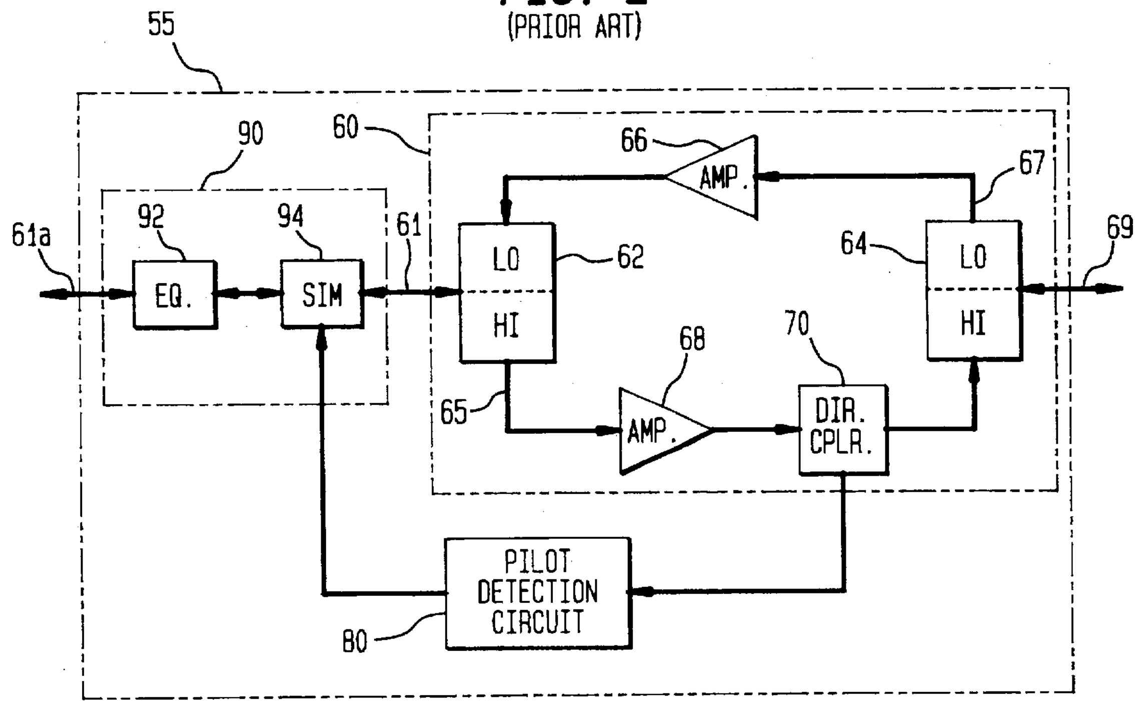
FIG. 2 is a block diagram of a prior art arrangement that uses a single pilot signal for controlling changes in forward and return signals due to changes in a cable section.

This is in contrast to the arrangement of U.S. Pat. No. 4,835,494 (Preschutti) which is shown in the present FIG. 2. More particularly, the arrangement of the present FIG. 2 is not capable of independently changing the equalization and amplification of first and second signals in first and second different frequency bands, respectively, that propagate in different directions in a cable section 61*a* in order to compensate for the different signal attenuation changes occurring in the first and second different frequency band signals on first cable section 61*a*. The problem with the arrangement of FIG. 2 is that when the simulator 94 corrects for the equalization and amplification of a high frequency band signal propagating in a downstream direction on cable section 61*a*, the amount of equalization and amplification of a low frequency band signal propagating in an upstream direction on cable section 61*a* provided by the simulator 94 is not different than that provided for the high frequency signal. Therefore, the simulator 94 does not independently correct for the attenuation change differences between the high and low frequency band signals to compensate for what is attenuation changes occurring across the first and second frequency bands in the first cable section 61*a*.

The ASC circuit 112 functions to detect a level of a pilot signal included within a first signal in a first frequency band propagating in a first direction within the bidirectional amplifier 100, and independently changes the equalization and the amplification across each of the frequency band of the first signal, and a second frequency band which is different than the first frequency band of a second signal that is propagating in a second direction within the bidirectional amplifier 100. As a result, the bidirectional amplifier 100 detects changes in a first cable section 111 from which the first signal is received as a result of, for example, temperature changes in the first cable section 111, and within the bidirectional amplifier 100 itself it independently changes the equalization and the amplification of the first and second signals having different frequency bands to compensate for signal attenuation changes that occur in the first cable section 111.

The design of the bidirectional amplifier 100 provides the advantages of improved communications in the upstream path of, for example, a Hybrid Fiber Coaxial (HFC) network, reduced manpower for installation and continuing maintenance of coaxial bidirectional amplifiers, and less gain variance in the return path to ensure more reliable communications through the use of separate devices for independently controlling the compensation and amplification in each of an upstream and downstream paths.

It is to be appreciated and understood that the specific embodiments of the invention described hereinabove are merely illustrative of the general principles of the invention. Various modifications may be made by those skilled in the art which are consistent with the principles set forth. For example, the Automatic Slope Control circuit 112 can be arranged to monitor a single upstream pilot signal received on the second cable section 119 instead of the single downstream pilot signal described hereinbefore that is received in the first coaxial cable section 111 and compensate for attenuation changes occurring in the second cable section 119 where the second cable section 119 is not part of a tree or branch network.

What is claimed is:

1. A bidirectional amplifier comprising:

first and second paths for propagating a first signal including a pilot signal and a second signal, respectively, having respective first and second different frequency bands in first and second opposite directions, respectively, within the bidirectional amplifier;

coupling means for coupling the first and second signals received from first and second cable paths, respectively, of a transmission medium onto the respective first and second paths and for coupling the second and first signals from the second and first paths, respectively, onto the respective second and first cable paths; and compensating means, which is disposed in the first and second paths and is responsive to the pilot signal in the first signal, for independently changing equalization and amplification of each of the first and second signals across the first and second frequency bands, respectively, propagating in the respective first and second paths for independently compensating for signal attenuation changes occurring in the first cable path of the transmission medium.

2. The bidirectional amplifier of claim 1 wherein the compensating means comprises:

pilot signal detection means for detecting the pilot signal in the first signal, and in response thereto for generating at least one control signal representative of a level of the detected pilot signal; and equalizing compensating means, which is responsive to the at least one control signal from the pilot signal detection means, for separately changing equalization of each of the first and second signals across the first and second frequency bands, respectively, propagating in the respective first and second paths to change the amplification of the first and second signals, respectively, and compensate for changes occurring in the first cable path of the transmission medium.

3. The bidirectional amplifier of claim 2 wherein the equalizing compensating means comprises first and second Bode Slope Equalizers located in the first and second path, respectively, each of the first and second Bode Slope Equalizers being responsive to the at least one control signal from the pilot signal detection means for separately equalizing the respective first and second signals propagating in the first and second paths, respectively.

4. The bidirectional amplifier of claim 3 wherein the compensating means further comprises a directional coupler for directing a portion of the first signal propagating on the first path to an input of the pilot detection means.

5. The bidirectional amplifier of claim 3 wherein the pilot signal detection means generates first and second DC drive voltages within first and second voltage ranges, respectively, to the respective first and second Bode Slope Equalizers, where the second voltage range includes DC drive voltages that are equal to or less than the DC drive voltages in the first voltage range.

6. The bidirectional amplifier of claim 1 wherein the first cable path of the transmission medium is a hybrid fiber coaxial cable.

7. The bidirectional amplifier of claim 1 wherein the coupling means comprises:

a first diplex filter for coupling the first signal including a pilot signal that is received from a first cable path of a transmission medium to the first path of the bidirectional amplifier, and for coupling signals propagating on the second path to the first cable path of the transmission medium; and a second diplex filter for coupling the second signal that is received from a second cable path of the transmission medium to the second path of the bidirectional amplifier, and for coupling the first signal on the first path to the second cable path of the transmission medium.

8. A method of compensating for signal transmission changes on a transmission medium in a bidirectional amplifier comprising the steps of:

(a) coupling a first data signal and a pilot signal in a first frequency band that is propagating in a first direction along a first cable path of the transmission medium onto a first path of the bidirectional amplifier and then onto a second cable path of the transmission medium;

(b) coupling a second signal in a second frequency band that is different than the first frequency band and is propagating in a second direction opposite to the first signal along the second cable path of the transmission medium onto a second path of the bidirectional amplifier and then onto the first cable path of the transmission medium;

(c) detecting the pilot signal while the first signal is propagating along the first path;

(d) generating at least one control signal representative of a level of the pilot signal in response to step (c); and (e) separately equalizing each of the first and second signals propagating in the first and second paths, respectively, in response to the at least one control signal generated in step (d) to independently change the amplification of the bidirectional amplifier in the first and second paths and independently compensate for signal attenuation changes occurring in the first cable path of the transmission medium.

9. The method of claim 8 wherein the first cable path of the transmission medium is a hybrid fiber coaxial cable.

10. The method of claim 8 wherein in performing step (e), passing the first and second signals through first and second Bode Slope Equalizers, respectively, located in the respective first and second paths, each of the first and second Bode Slope Equalizers being responsive to the at least one control signal generated in step (d) for separately equalizing the respective first and second signals propagating in the first and second paths, respectively.

11. The method of claim 10 wherein:

in performing step (d), generating the at least one control voltage comprising first and second DC drive voltages within first and second voltage ranges, respectively, where the second voltage range includes DC drive voltages that are equal to or less than the DC drive voltages in the first voltage range; and in performing step (e) receiving the first and second DC drive voltages in the first and second Bode Slope Equalizers, respectively, for separately equalizing the respective first and second signals propagating in the first and second paths, respectively.

* * * * *